United States Patent
Lu et al.

(10) Patent No.: US 7,236,593 B2
(45) Date of Patent: Jun. 26, 2007

(54) APPARATUS FOR ENCRYPTION AND DECRYPTION, CAPABLE OF USE IN ENCRYPTION AND DECRYPTION OF ADVANCED ENCRYPTION STANDARD

(75) Inventors: Chih-Chung Lu, Shulin (TW); Shau-Yin Tseng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 869 days.

(21) Appl. No.: 10/108,355

(22) Filed: Mar. 29, 2002

(65) Prior Publication Data

US 2003/0099352 A1 May 29, 2003

(30) Foreign Application Priority Data

Oct. 4, 2001 (TW) .............. 90124577 A (51) Int. Cl.
H04L 9/28 (2006.01)
H04L 9/18 (2006.01)

(52) U.S. Cl. .................. 380/42; 380/47; 380/259; 713/174

(58) Field of Classification Search .......... 380/42, 380/47, 259; 713/174
See application file for complete search history.

(56) References Cited

U.S. PATENT DOCUMENTS

| | | | | |
|---|---|---|---|---|
| 4,322,577 A * | 3/1982 | Brandstrom | ........... | 380/37 |
| 4,797,921 A * | 1/1989 | Shiraishi | ........... | 380/28 |
| 5,818,744 A * | 10/1998 | Miller et al. | ........... | 708/654 |
| 6,246,768 B1 * | 6/2001 | Kim | ........... | 380/28 |
| 6,779,011 B2 * | 8/2004 | Weng et al. | ........... | 708/492 |
| 6,873,707 B1 * | 3/2005 | Batcher | ........... | 380/255 |
| 6,914,984 B2 * | 7/2005 | Lim | ........... | 380/29 |
| 6,931,127 B2 * | 8/2005 | Lim | ........... | 380/37 |
| 6,937,727 B2 * | 8/2005 | Yup et al. | ........... | 380/37 |
| 2002/0191784 A1 * | 12/2002 | Yup et al. | ........... | 380/37 |

(Continued)

FOREIGN PATENT DOCUMENTS

EP 1246389 10/2002

(Continued)

OTHER PUBLICATIONS

Wu et al., "CryptoManiac: A Fast Flexible Architecture for Secure Communication", 2001, IEEE, pp. 110-119.*

(Continued)

Primary Examiner—Kambiz Zand
Assistant Examiner—Thomas Szymanski
(74) Attorney, Agent, or Firm—Rabin & Berdo, PC (57) ABSTRACT

An apparatus for encryption and decryption, capable of use in encryption and decryption of advanced encryption standard. Byte substitution operation and inverse byte substitution operation are to be combined. Byte substitution operation can be expressed as y=M*multiplicative_inverse(x)+c while inverse byte substitution operation can be expressed as x=multiplicative_inverse($M^{-1}$*(y+c)), wherein M and $M^{-1}$ are inverse matrix of each other and c is a constant matrix. Since the two equations employ a look-up table, that is, multiplicative_inverse(x), the lookup tables for use in byte substitution and inverse byte substitution operations are to be combined according to the invention so as to lower hardware complexity of the implementation. In addition, main operations of column mixing operation and inverse column mixing operation are to be rearranged to combine the two operations in part, resulting in simplified hardware implementation.

4 Claims, 6 Drawing Sheets

U.S. PATENT DOCUMENTS

2003/0108195 A1* 6/2003 Okada et al. ............... 380/37
2003/0198345 A1* 10/2003 Van Buer .................... 380/43

FOREIGN PATENT DOCUMENTS

| EP | 1271839 | | 1/2003 |
| EP | 1292067 | | 3/2003 |
| WO | WO 03010919 A1 | * | 2/2003 |
| WO | 03/019357 | | 3/2003 |
| WO | WO 03053001 A1 | * | 6/2003 |

OTHER PUBLICATIONS

Burke et al., "Architectural Support for Fast Symmetric-Key Cryptography", Nov. 12-15, 2000 ACM, pp. 178-189.*

Chodowiec et al., "Fast Implementation of Secret-Key Block Ciphers Using Mixed Inner-and Outer-Round Pipelining", Feb. 11-13, 2001 ACM. pp. 94-102.*

"AES Algorithm Information", INTERNET, Feb. 28, 2001, <URL:http://csrc.nist.gov/CryptoToolkiet/aes/rijndael/> pp. 1-2; retrieved online Feb. 15, 2006.*

Daemen et al, Mar. 9, 1999 <URL:http://csrc.nist.gov/CryptoToolkiet/aes/rijndael/Rijndael-ammended.pdf> pp. 1-45; retrieved online Feb. 15, 2006.*

"Dynamic generation of s-boxes in block cipher systems" El-Ramly, S.H. et al, Radio Science Conference, 2001. NRSC 2001. Proceedings of the Eighteenth National, vol. 2, Mar. 27-29, 2001 pp. 389-397 vol. 2.*

* cited by examiner

APPARATUS FOR ENCRYPTION AND DECRYPTION, CAPABLE OF USE IN ENCRYPTION AND DECRYPTION OF ADVANCED ENCRYPTION STANDARD

This application incorporates by reference of Taiwan application Serial No. 90124577, filed on Oct. 4, 2001.

BACKGROUND OF THE INVENTION

1. Field of the Invention

The invention relates in general to an apparatus for encryption and decryption, and more particularly to an apparatus for encryption and decryption, capable of use in encryption and decryption of advanced encryption standard (AES).

2. Description of the Related Art

Since the electronic-business (e-business) grows rapidly for the few years and the numbers of on-line transactions are increasing, data encryption is required to be much stricter for the sake of data security. A stricter encryption standard, advanced encryption standard (AES), has been developed after the widely used data encryption standard (DES) and is expected to be replaced for DES so as to fulfil the stricter data security requirement. An AES system is a symmetric-key system in which the sender and receiver of a message share a single, common key, thereafter called a subkey, which is used to encrypt and decrypt the message. The data length of a subkey may be chosen to be any of 128, 192, or 256 bits while a plaintext and a ciphertext can be such as 128 bits. For the sake of simplicity, hereinafter, plaintexts, ciphertexts, and subkeys are chosen to be 128 bits in length.

The AES system encrypts a plaintext according to the following encryption algorithm.

| Encryption Algorithm of AES |
| --- |
| AddRoundKey |
| for round=1 to Nr−1 |
|     KeyExpansion |
|     SubBytes |
|     ShiftRows |
|     MixColumns |
|     AddRoundKey |
| end for |
| SubBytes |
| ShiftRows |
| AddRoundKey |

In this encryption algorithm, a round key addition operation (AddRoundKey) is first to perform a bitwise exclusive-OR (EX-OR) operation on the plaintext and the first subkey and to output the result of the EX-OR operation. Next, the algorithm proceeds to the following looping. The number of rounds of the looping is set to Nr−1 in which Nr is specified according to the AES specification. For each round, a key expansion operation (KeyExpansion) is performed to produce a new subkey based on a previous subkey. That is, in the first round of the looping, the first subkey is used to generate the second subkey by the KeyExpansion. After the KeyExpansion, a byte substitution operation (SubBytes) acts on the result of the AddRoundKey. Next, a row shifting operation (ShiftRows) is performed and then a column mixing operation (MixColumns) acts on the result of the ShiftRows. The first round is ended by performing the EX-OR operation on the result of the MixColumns and the current subkey, i.e., the second subkey. The looping are executed for the next round until the number of rounds of the looping is reached. As mentioned above, for each round, a new subkey is to be generated. For example, in the second round of the looping, the KeyExpansion is performed to generate the third subkey based on the second subkey. The generation of the other subkeys is done in the same way. When the looping is completed, the ciphertext is obtained by processing the result of the looping through the SubBytes, ShiftRows, and AddRoundKey.

The AES system decrypts the ciphertext according to the following decryption algorithm.

| Decryption Algorithm of AES |
| --- |
| AddRoundKey |
| for round=1 to Nr−1 |
|     InvKeyExpansion |
|     InvShiftRows |
|     InvSubBytes |
|     InvMixColumns |
|     AddRoundKey |
| end for |
| InvShiftRows |
| InvSubBytes |
| AddRoundKey |

The operations in decryption are basically the inverse of the operations in encryption. The AES decryption includes the following steps. First, the inverse of AddRoundKey (InvAddRoundKey) is performed on the ciphertext and the previous subkey produced in the encryption above, for example, the $10^{th}$ subkey that is assumed to be the last produced subkey after the encryption operation, and to output the result of the InvAddRoundKey, wherein the result of the InvAddRoundKey is referred to as decryption input ciphertext, for the sake of brevity. Note that since the InvAddRoundKey is identical to the AddRoundKey due to the characteristic of EX-OR operation, InvAddRoundKey is hereinafter referred to as AddRoundKey. Next, the following looping is performed. For each round of the looping, the inverse of KeyExpansion (InvKeyExpansion) is performed on an input subkey to produce an output subkey based on the input subkey, where the output subkey, in the encryption, is the immediately produced subkey before the input subkey produced. For example, in the first round, the InvKeyExpansion is applied to the $10^{th}$ subkey (the input subkey) so as to produce the ninth subkey (the output subkey); in the second round, the application of InvKeyExpansion to the ninth subkey produces the eighth subkey; and so on. Next, the decryption input ciphertext is processed through the inverse of SubBytes (InvSubBytes), the inverse of ShiftRows (InvShiftRows), and the inverse of MixColumns (InvMixColumns). After that, AddRoundKey (i.e. InvAddRoundKey) is performed on the result of the last operation and the current subkey, resulting in the next decryption input ciphertext for the next round. The current key, for example, in the first round, is the ninth subkey after the application of InvKeyExpansion to the $10^{th}$ subkey. Afterward, the looping is performed until the number of round of the looping is reached. The decryption result is finally obtained by processing the result from the rounds of the looping through the InvSubBytes, InvShiftRows, and AddRoundKey.

As described above, the AES algorithm has five main operations, namely, AddRoundKey, KeyExpansion, SubBytes, ShiftRows, and MixColumns. These operations will be described in the following. For the sake of brevity, hereinafter, the description employs several notations. (1)

The output of one operation is denoted by "out" while the input of the operation is denoted by "in". (2) The notation "+" (or "⊕") denotes bitwise exclusive-OR operation (EX-OR) other than addition. Since the five main operations are performed sequentially during the encryption/decryption and the output of an immediate operation (out) is as the input of its successive operation (in), these outputs and inputs of these operations will be denoted, for the sake of brevity, by out's and in's only, without names particularly denoted for them. In addition, plaintexts, ciphertexts, and subkeys have data lengths of 128 bits and are represented by 4×4 matrices with elements of 8 bits.

Figure 1:
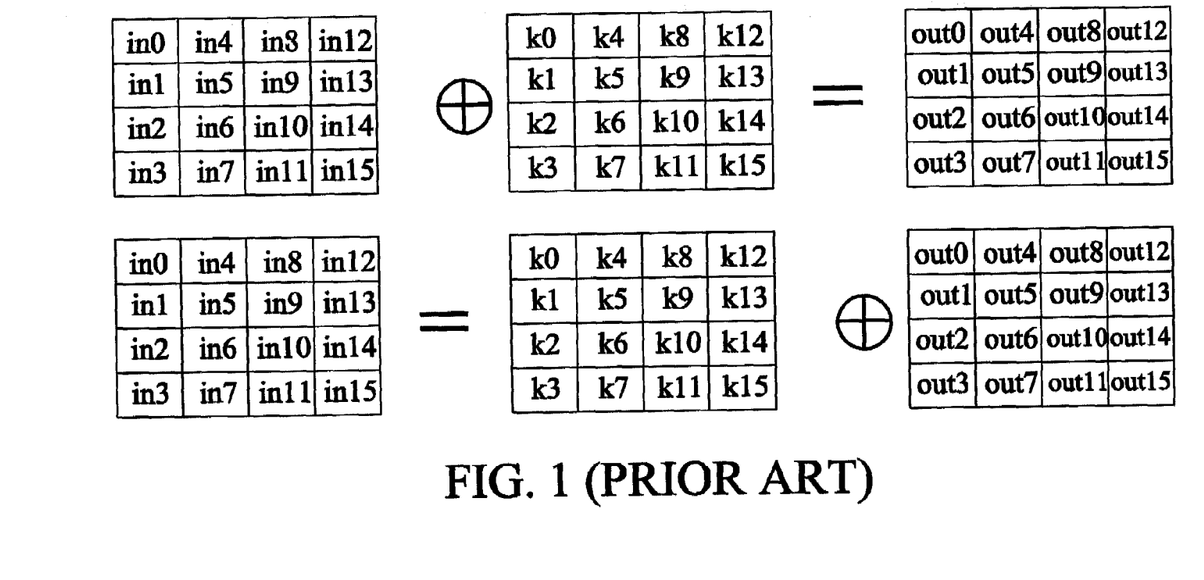
FIG. 1 illustrates the effect of AddRoundKey on data.

FIG. 1 illustrates the effect of AddRoundKey on data. As mentioned above, the operation of AddRoundKey is bitwise exclusive-OR (EX-OR) operation. The EX-OR is performed on an input data code (in) and a subkey (k), resulting in an output data code (out). By the characteristic of EX-OR operation, the input data code (in) is equal to the EX-OR operation of the output data code (out) and the subkey (k). In FIG. 1, AddRoundKey is illustrated in terms of respective elements and is represented as inN ⊕kN=outN, where N is an integer indicative of the corresponding element's number. For the sake of brevity, this notation will hereinafter be adopted in the drawings.

Figure 2:
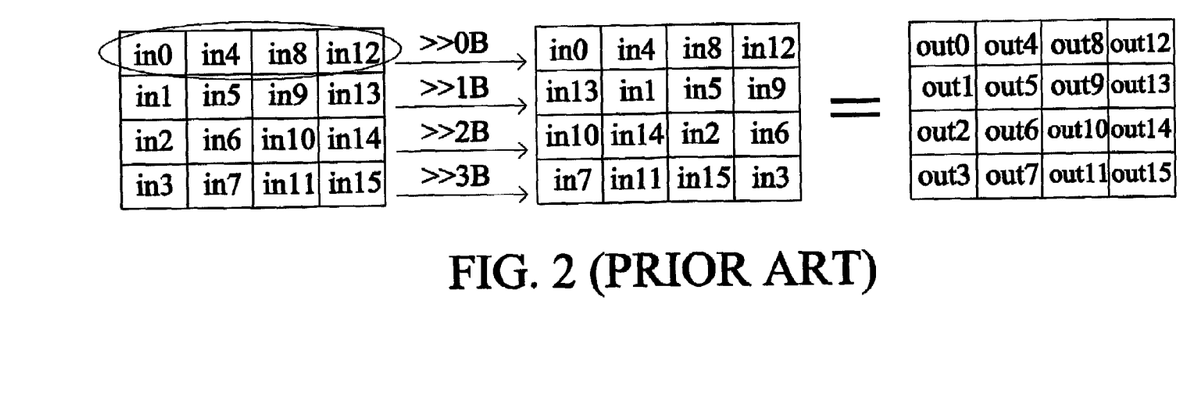
FIG. 2 illustrates the effect of ShiftRows on data.

FIG. 2 illustrates the effect of ShiftRows on data. In ShiftRows, the rows of an input data code (in), for example, the output of the AddRoundKey, is cyclically shifted to the right over different offsets. For example, the first row is not shifted (or shifted over zero byte), the second row is shifted to the right over one byte, the third row over two bytes, the fourth over three bytes and then the output of the ShifRows (out) is obtained as shown in the left of FIG. 2. If ShiftRows is in the way as in the example, the inverse of the ShiftRows (InvShiftRows) acts on its input data code in an inverse manner of the ShiftRows. That is, the first row of the input data code to InvShiftRows is not shifted (or shifted over zero byte), the second row is shifted to the left over one byte, the third over two bytes, and the fourth over three bytes.

Figure 3:
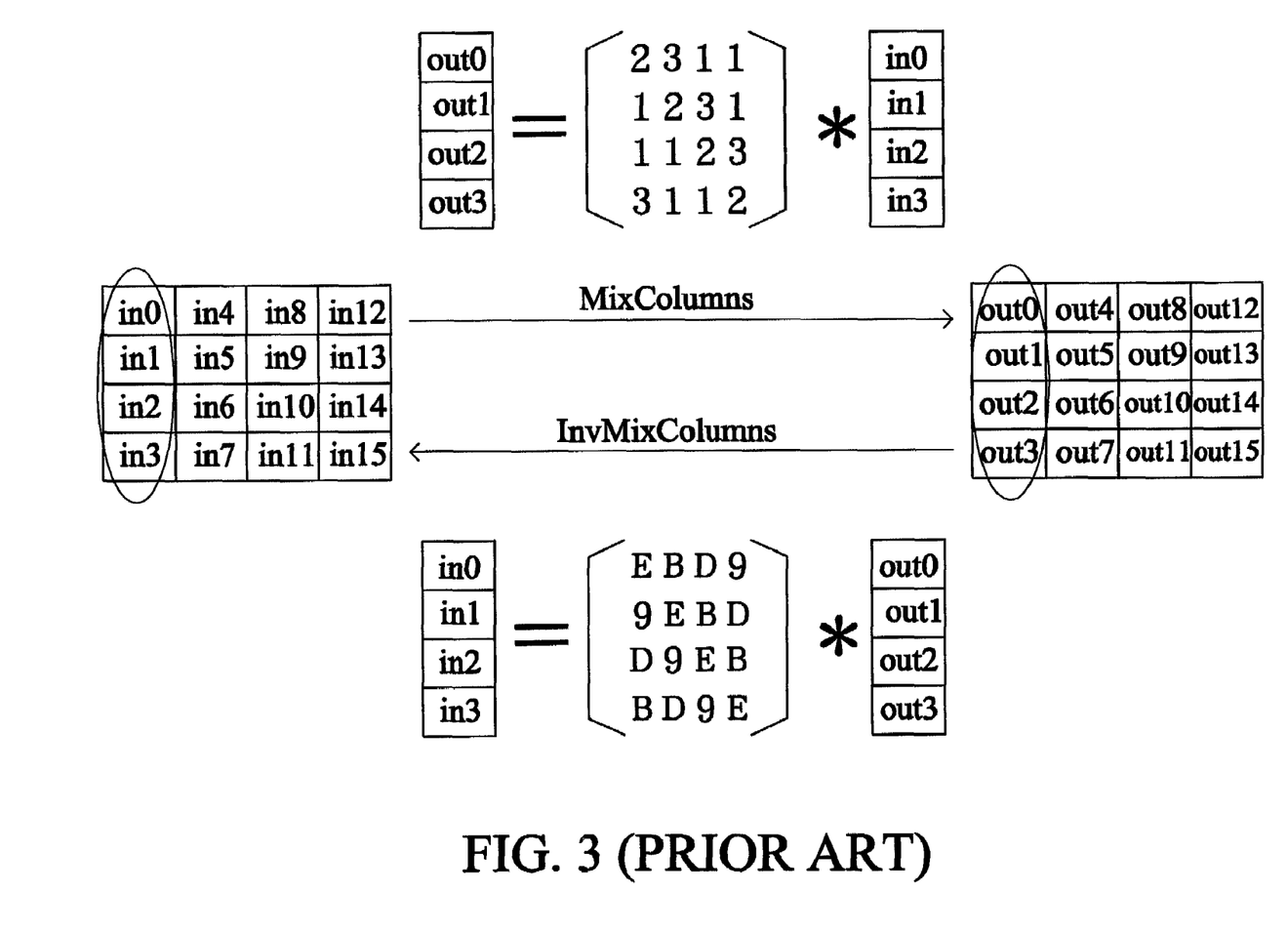
FIG. 3 illustrates the effect of MixColumns/InvMixColumns on data.

FIG. 3 illustrates the effect of MixColumns/InvMixColumns on data. In MixColumns, every column of an input data code, e.g., obtained from the output of the ShiftRows, is transformed into the corresponding column of the output data code by the matrix multiplication of a specific multiplication matrix by the column. For example, the first column of the input data code (in) with elements in0, in1, in2, and in3 is multiplied by a 4×4 matrix in the upper of FIG. 3, resulting in the first column of the output of the MixColumns with elements out0, out1, out2, and out3. Conversely, the application of MixColumns to all columns of the output data code with the inverse of the specific multiplication matrix results in the input data code, e.g., as illustrated in the lower matrix multiplication. That is, InvMixColumns uses a specific multiplication matrix that is the inverse of the specific multiplication matrix for MixColumns.

Figure 4:
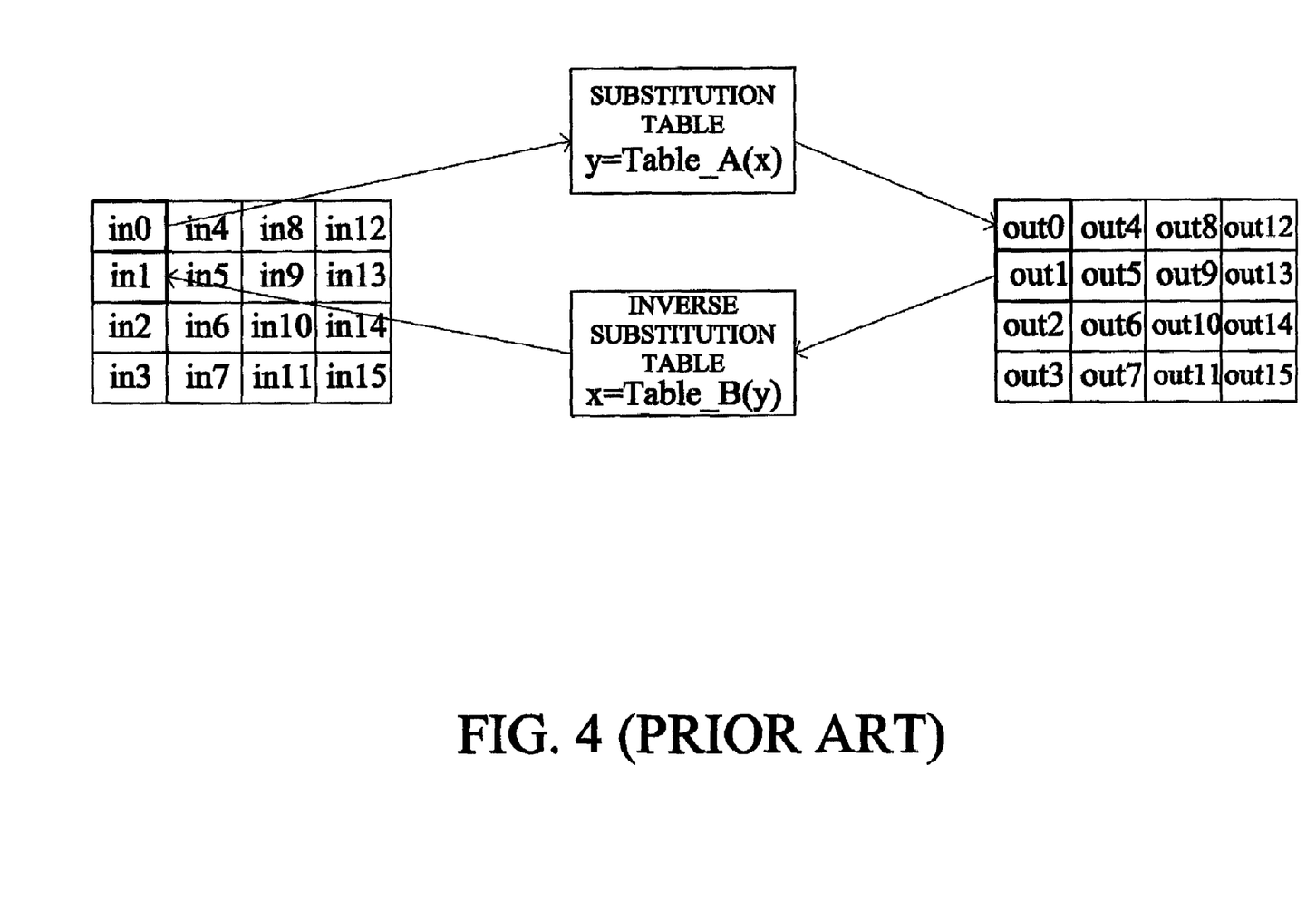
FIG. 4 illustrates the effect of SubBytes/InvSubBytes on data.

FIG. 4 illustrates the effect of SubBytes/InvSubBytes on data. SubBytes is a non-linear byte substitution, operating on every byte of the input data code independently. The substitution table used in the substitution operation is called S-box, and the application of the S-box to each byte of the input data code (say x) results in one byte of data (say y). The operation of the S-box can be expressed as:

$$y=M*\text{multiplicative\_inverse}(x)+c, \quad (1)$$

where $$M = \begin{pmatrix} 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \\ 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \end{pmatrix} \text{ and } c = [0\ 1\ 1\ 0\ 0\ 0\ 1\ 1]^T.$$

Since the multiplicative inverse (multiplicative_inverse) is a complicated function, the mostly used approach to SubBytes is to use a look-up table to obtain y from x. As shown in FIG. 4, in SubBytes, each element of the output data code, such as out0, is obtained from an element of the input data code, such as in0, through a look-up table, which is represented by y=Table_A(x). Table_A is indicative of the substitution table, i.e., the S-box of AES. Conversely, the application of InvSubBytes to every element obtained from the SubBytes, such as out1, results in the corresponding element of the input data code for the SubBytes, such as in0, through an inverse look-up table, which is represented by x=Table_B(y). Table_B is indicative of the inverse substitution table, i.e., the inverse S-box of AES (inv-S-box). In practice, S-box and inv-S-box require substantial hardware, making them not economic to be implemented.

In implementation of AES, several main difficulties should be overcome. As described above, each of the algorithms of AES encryption and decryption has different processing steps, wherein inverse operations and non-linear substitution operations are involved. Particularly, SubBytes and InvSubBytes, the non-linear substitution operations, require referring to respective look-up tables. The implementation of the substitution operations will occupy substantial memory space (e.g., 2×16×256×8 bits) under the design requirement for high efficient encryption/decryption. In addition, MixColumns and InvMixColumns involve matrix multiplication. If they are not to be integrated effectively, their implementation will also occupy a substantial amount of operating resource. Thus, in implementation, these operations should be considered and redesigned as so to lower the hardware complexity and save the operating resource.

SUMMARY OF THE INVENTION

It is therefore an object of the invention to provide an apparatus for encryption and decryption, capable of being used in encryption and decryption of advanced encryption standard (AES), wherein SubBytes and InvSubBytes employ a look-up table, thus reducing the hardware complexity and saving the operating resource.

It is another object of the invention to provide an apparatus for encryption and decryption, capable of use in encryption and decryption of AES, wherein modules for performing MixColumns and InvMixColumns are integrated so as to reduce the hardware complexity and save the operating resource.

The invention achieves the above-identified objects by providing apparatuses for encryption and decryption, capable of use in encryption and decryption of AES, described as follows.

The apparatuses for encryption and decryption include a byte-substitution/inverse-byte-substitution operation (Sub- Bytes/InvSubBytes) module, a column-mixing/inverse-column-mixing operation (MixColumns/InvMixColumns) module, and a key expansion operation (KeyExpansion) module. The operational characteristic of the modules is to be described as follows.

The SubBytes/InvSubBytes module includes an inverse matrix operation module, a first multiplexer, a multiplicative inverse operation module, a matrix operation module, and a second multiplexer. Being capable of use in advanced encryption standard (AES), the SubBytes/InvSubBytes module is an apparatus for selectively performing byte substitution operation (SubBytes) and inverse byte substitution operation (InvSubBytes) on an input data code so as to output a required output data code. The multiplicative inverse operation module is to perform the operation of multiplicative_inverse( ), so the result of the multiplicative inverse operation can be denoted by y=multiplicative_inverse(x). Since multiplicative_inverse( ) involves complex operation, it is generally implemented by using table-lookup approach. In addition, the matrix operation module is used for performing the operation represented by out=in*M+c while the inverse matrix operation module is used for performing the operation represented by out=(in+c)*M'. The first multiplexer has a first input terminal and a second input terminal. The first input terminal of the first multiplexer is to receive the output data code from the inverse matrix operation module while the second input terminal of the first multiplexer is for receiving the input data code. The first multiplexer, according to a selection signal, selects either the output data code from the inverse matrix operation module or the input data code to be fed into the multiplicative inverse operation module for processing. The second multiplexer has a first terminal and a second terminal. The second terminal of the second multiplexer is to receive the output data code from the matrix operation module. The first terminal of the second multiplexer is to receive the output data code from the multiplicative inverse operation module. The second multiplexer selects one of its two input data codes, according to the selection signal. When the selection signal is equal to 1, the SubBytes/InvSubBytes module is to perform SubBytes. When the selection signal is equal to 0, the SubBytes/InvSubBytes module is to perform InvSubBytes. For performing SubBytes, the input data code is fed into the multiplicative inverse operation module through the first multiplexer to perform table-lookup. After the table-lookup, the result is delivered to the matrix operation module so as to perform the operation of out=in*M+c. The output data code from the matrix operation module is then outputted through the second multiplexer and is as the result of the SubBytes. For InvSubBytes, the input data code is first fed into the inverse matrix operation module to perform the operation of out=(in+c)*M'. Through the first multiplexer, the result of the inverse matrix operation is fed into the multiplicative inverse operation module so as to be processed. The output data code from the matrix operation module is then outputted through the second multiplexer and is as the result of the InvSubBytes.

The MixColumns/InvMixColumns module is an apparatus for performing column mixing operation (MixColumns) and inverse of column mixing operation (InvMixColumns) on an input data code, capable of use in advanced encryption standard (AES), wherein the input data code includes a first code, a second code, a third code, and a fourth code. For the sake of brevity, the first to fourth codes are denoted by a, b, c, and d, and the symbol "+" represents bitwise exclusive-OR (EX-OR) operation. The MixColumns/InvMixColumns module includes: a first EX-OR device for performing the operation of w1=a+b; a second EX-OR device for performing the operation of w2=a+c; a third EX-OR device for performing the operation of w3=c+d; a first multiplier for performing the operation of w4=2*w1; a fourth EX-OR device for performing the operation of wt=b+w3; and a fifth EX-OR device for performing the operation of outx=wt+w4=b+w3+w4. The output data code from the fifth EX-OR device is the result of the MixColumns performed by the MixColumns/InvMixColumns module. In addition, the MixColumns/InvMixColumns module further includes a second multiplier for performing the operation of w5=2*w3; a sixth EX-OR device for performing the operation of wu=w2+w5; a seventh EX-OR device for performing the operation of w6=wu+w4=w2+w4+w5; a third multiplier for performing the operation of w7=2*w6; a fourth multiplier for performing the operation of w8=2*w7; and an eighth EX-OR device for performing the operation of outy=w8+outx. The output data code from the eighth EX-OR device is the result of the InvMixColumns performed by the MixColumns/InvMixColumns module.

The KeyExpansion module is an apparatus for performing key expansion operation (KeyExpansion), capable of use in advanced encryption standard (AES), so as to obtain a desired subkey based on a given subkey, wherein the given subkey and the desired subkey are two consecutive subkeys. When KeyExpansion is performed, the desired subkey is the next subkey of the given subkey. When InvKeyExpansion is performed, the desired subkey is the previous subkey of the given subkey. The given subkey and the desired subkey each has a first data column, a second data column, a third data column, a fourth data column. The KeyExpansion module includes a first, a second, a third, and a fourth EX-OR device, a first, a second, a third, and a fourth multiplexers, and a column data converting device, wherein each of the multiplexers has its first input terminal and second input terminal, and selects one data code from the two input terminals according to a selection signal denoted by ec. In this module, KeyExpansion and InvKeyExpansion are implemented as follows.

KeyExpansion is to output the next subkey, i.e., desired subkey, of the input subkey, i.e., given subkey, based on the input subkey. When the selection signal ec is set to 1, the fourth data column of the given subkey can be converted into a special data column by the column data converting device via the fourth multiplexer. The special data column is then fed into the first EX-OR gate, and the first EX-OR gate performs EX-OR operation on the special data column and the first data column of the given subkey, resulting in the first data column of the next subkey. Since the selection signal ec is set to one, the first data column of the next subkey is fed into the second EX-OR gate through the first multiplexer, and the second EX-OR gate performs EX-OR operation on the first data column of the next subkey and the second data column of the given subkey, resulting in the second data column of the next subkey. The second data column of the next subkey is fed into the third EX-OR gate through the second multiplexer, and the third EX-OR gate performs EX-OR operation on the second data column of the next subkey and the third data column of the given subkey, resulting in the third data column of the next subkey. The third data column of the next subkey is fed into the fourth EX-OR gate through the third multiplexer, and the fourth EX-OR gate performs EX-OR operation on the third data column of the next subkey and the fourth data column of the given subkey, resulting in the fourth data column of the next subkey.

InvKeyExpansion is to output the previous subkey, i.e., desired subkey, of an input subkey, i.e., given subkey, based on the input subkey. When the selection signal is set to 0, the third data column of the given subkey is fed into the third EX-OR gate through the third multiplexer, and the foruth EX-OR gate performs EX-OR operation on the third data column of the given subkey and the fourth data column of the given subkey, resulting in the fourth data column of the previous subkey. Next, the fourth data column of the previous subkey is fed into the column data converting device through the fourth multiplexer, so as to obtain the special data column. The special data column is then fed into the first EX-OR gate, and the first EX-OR gate performs EX-OR operation on the special data column and the first data column of the given subkey, resulting in the first data column of the previous subkey. Since the selection signal ec is set to 0, the first data column of the given subkey is fed into the second EX-OR gate through the first multiplexer, and the second EX-OR gate performs EX-OR operation on the first data column of the given subkey and the second data column of the given subkey, resulting in the second data column of the previous subkey. The second data column of the given subkey is fed into the third EX-OR gate through the second multiplexer, and the third EX-OR gate performs EX-OR operation on the second data column of the given subkey and the third data column of the given subkey, resulting in the third data column of the previous subkey.

The invention achieves the above-identified objects by providing an apparatus for encryption and decryption, capable of use in advanced encryption standard (AES) encryption and decryption, for selectively performing operations in encryption/decryption on an input data code with a subkey, and outputting an output data code. The apparatus includes a bitwise exclusive-OR (EX-OR) device, a first multiplexer, a second multiplexer, a third multiplexer, a fourth multiplexer, a fifth multiplexer, a byte-substitution/inverse-byte-substitution operation (SubBytes/InvSubBytes) module, a row-shifting/inverse-row-shifting operation (ShiftRows/InvShiftRows) module, and a column-mixing/inverse-column-mixing operation (MixColumns/InvMixColumns) module. The EX-OR device is used for performing bitwise exclusive-OR (EX-OR) operation on the input data code and the subkey so as to output a first output code. The first multiplexer has a first input terminal and a second input terminal. The first input terminal of the first multiplexer is used for receiving a cipher data code and the second input terminal of the first multiplexer is used for receiving the first output code, wherein the first multiplexer, according to a selection signal, selectively outputs either the cipher data code or the first output code as a first product code. The SubBytes/InvSubBytes module, coupled to the first multiplexer, is used for selectively performing byte-substitution/inverse-byte-substitution operation (SubBytes/InvSubBytes) on the first output code so as to output a substitution code. The ShiftRows/InvShiftRows module, coupled to the SubBytes/InvSubBytes module, is employed for selectively performing row-shifting/inverse-row-shifting operation (ShiftRows/InvShiftRows) on the substitution code so as to output a shifted code. The second has a first input terminal and a second input terminal. The first input terminal of the second multiplexer is used for receiving the first output code and the second input terminal of the second multiplexer is used for receiving the shifted code, wherein the second multiplexer, according to the selection signal, selectively outputs either the first output code or the shifted code as a second product code. The MixColumns/InvMixColumns module, coupled to the second multiplexer, is employed for selectively performing column-mixing/inverse-column-mixing operation (MixColumns/InvMixColumns) on the second product code so as to output a mixed code. The third multiplexer has a first input terminal and a second input terminal. The first input terminal of the third multiplexer is used for receiving the second product code and the second input terminal of the third multiplexer is used for receiving the mixed code, wherein the third multiplexer, according to a cipher detection signal, selectively outputs either the first output code or the shifted code as a third product code, wherein the third product code is the cipher data code. The fourth multiplexer has a first input terminal and a second input terminal. The first input terminal of the fourth multiplexer is used for receiving the shifted code and the second input terminal of the fourth multiplexer is used for receiving the cipher data code, wherein the fourth multiplexer, according to the selection signal, selectively outputs either the shifted code or the cipher data code as a fourth product code. The fifth multiplexer has a first input terminal and a second input terminal. The first input terminal of the fifth multiplexer is used for receiving the fourth product code and the second input terminal of the fifth multiplexer is used for receiving the first output code, wherein the fifth multiplexer, according to a round detection signal, selectively outputs either the fourth product code or the first output code as the output data code for the apparatus.

Other objects, features, and advantages of the invention will become apparent from the following detailed description of the preferred but non-limiting embodiments. The following description is made with reference to the accompanying drawings.

DETAILED DESCRIPTION OF THE INVENTION

Embodiment 1

In embodiment 1, the byte substitution operation (SubBytes) and the inverse of SubBytes are integrated and the integration is to be implemented with suitable hardware. For the sake of completeness, the equation (1) is repeated that:

$$y = M * \text{multiplicative\_inverse}(x) + c, \quad (1)$$

where $$M = \begin{pmatrix} 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \\ 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \end{pmatrix} \text{ and } c = [0\ 1\ 1\ 0\ 0\ 0\ 1\ 1]^T.$$

In implementation of SubBytes and InvSubBytes, a substantial amount of hardware resource will be occupied if SubBytes and InvSubBytes use respective tables in encryption and decryption. Accordingly, it is desirable to obtain a simplified equation so as to reduce the hardware complexity. From equation (1), the inverse operation of equation (1) is obtained as follows:

$$x = \text{multiplicative\_inverse}^{-1}(M^{-1}*(y+c)). \quad (2)$$

Since multiplicative_inverse( ) is equivalent to multiplicative_inverse$^{-1}$( ), the equation (2) can be expressed as:

$$x = \text{multiplicative\_inverse}(M^{-1}*(y+c)). \quad (3)$$

By the inverse matrix operation, the $M^{-1}$ is determined as:

$$M' = M^{-1} = \begin{pmatrix} 0 & 1 & 0 & 1 & 0 & 0 & 1 & 0 \\ 0 & 0 & 1 & 0 & 1 & 0 & 0 & 1 \\ 1 & 0 & 0 & 1 & 0 & 1 & 0 & 0 \\ 0 & 1 & 0 & 0 & 1 & 0 & 1 & 0 \\ 0 & 0 & 1 & 0 & 0 & 1 & 0 & 1 \\ 1 & 0 & 0 & 1 & 0 & 0 & 1 & 0 \\ 0 & 1 & 0 & 0 & 1 & 0 & 0 & 1 \\ 1 & 0 & 1 & 0 & 0 & 1 & 0 & 0 \end{pmatrix}. \quad (4)$$

Thus, equation (3) can be expressed as:

$$x = \text{multiplicative\_inverse}(M'*(y+c)). \quad (5)$$

Figure 5:
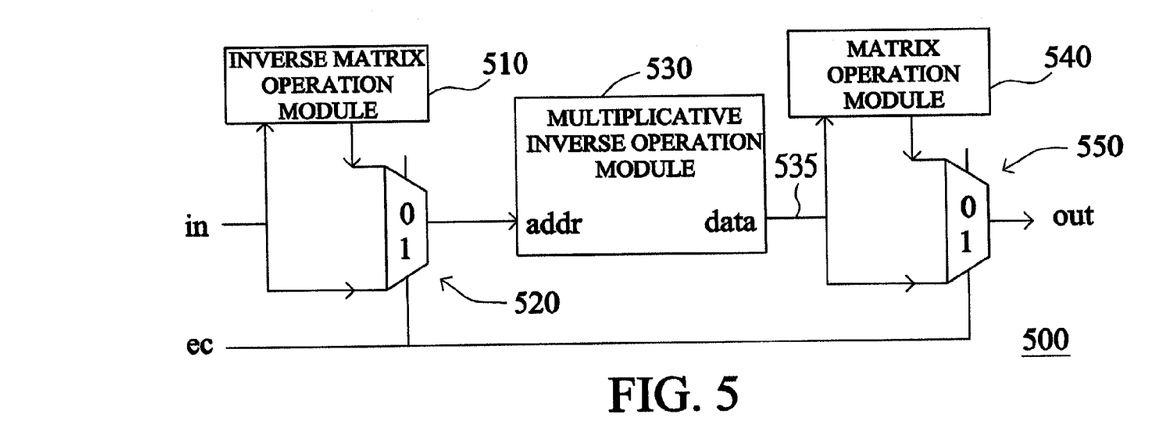
FIG. 5 is a block diagram of an integrated SubBytes/InvSubBytes module, capable of use in encryption and encryption of AES, according to a first embodiment of the invention.

As examined from equations (1) and (5), a common look-up table, i.e., multiplicative_inverse( ), is employed so the S-box and inverse S-box can be integrated to reduce the hardware requirement for SubBytes and InvSubBytes. FIG. 5 shows an integrated SubBytes/InvSubBytes module, capable of use in encryption and decryption of AES. As shown in FIG. 5, a SubBytes/InvSubBytes module 500 includes an inverse matrix operation module 510, a multiplexer 520, a multiplicative inverse operation module 530, a matrix operation module 540, and a multiplexer 550. The multiplicative inverse operation module 530 is to perform the operation of the multiplicative inverse defined by: data=multiplicative_inverse(addr), and is implemented by way of table lookup. That is, by referring to the look-up table according to an input code (addr), the operation result (data) is obtained. The inverse matrix operation module 510 is to perform the operation of the equation: out=(in+c)*M' while the matrix operation module 540 is for performing the operation of the equation: out=in*M+c, wherein M and $M^{-1}$ are expressed, for example, as above. When SubBytes is to be performed, a selection signal (ec) is set to 1. When the selection signal (ec) is set to 1, the input data code (in) is fed into the multiplicative inverse operation module 530, via the multiplexer 520, so as to output a table-lookup data code 535, i.e., multiplicative_inverse(in), by referring to the look-up table. The matrix operation module 540 then performs the operation of the equation, out=in*M+c, on the table-lookup data code 535, thus completing the SubBytes. Conversely, when InvSubBytes is to be performed, the selection signal (ec) is set to 0. Next, the input data code (in) is fed into the inverse matrix operation module 510 so as to perform the operation of the equation: out=(in+c)*M. Based on the output of the inverse matrix operation module 510, the table-lookup data code 535 is obtained by feeding it into the multiplicative inverse operation module 530 through table looking up, thereby completing the InvSubBytes.

The SubBytes/InvSubBytes module 500 performs the functions of both S-box and inverse S-box with only one look-up table so that the amount of hardware for implementation of SubBytes and InvSubBytes has a significant decrease of 57%, as compared with the original hardware requirement without the functional integration.

Embodiment 2

In embodiment 2, the operation of mixing columns (MixColumns) and the inverse of MixColumns are integrated and the functional integration is to be implemented with suitable hardware. In the operations of MixColumns and InvMixColumns, two main calculations are defined by the following two equations:

$$\text{out}x = [2\ 3\ 1\ 1]*[a\ b\ c\ d]^T \text{ and} \quad (6)$$

$$\text{out}y = [14\ 11\ 13\ 9]*[a\ b\ c\ d]^T. \quad (7)$$

After being ungrouping, the two equations above can be expressed as:

$$\text{out}x = 2(a+b)+b+(c+d) \text{ and} \quad (8)$$

$$\text{out}y = 4(2(a+b)+2(c+d)+(a+c))+2(a+b)+b+(c+d). \quad (9)$$

The operations for obtaining the results of equations (8) and (9) are listed in TABLE 1. Execution of the first five steps listed results in outx, and then executing the five steps after obtaining outx results in outy. Accordingly, in implementation, the hardware for the first five steps can be used for obtaining both results of the equations above, reducing the hardware complexity and saving operating resource.

TABLE 1

| step | Operations |
| --- | --- |
| 1 | w1 = a + b |
| 2 | w2 = a + c |
| 3 | w3 = c + d |
| 4 | w4 = 2 * w1 |
| 5 | outx = b + w3 + w4 |
| 6 | w5 = 2 * w3 |
| 7 | w6 = w2 + w4 + w5 |
| 8 | w7 = 2 * w6 |
| 9 | w8 = 2 * w7 |
| 10 | outy = w8 + outx |

Figure 6:
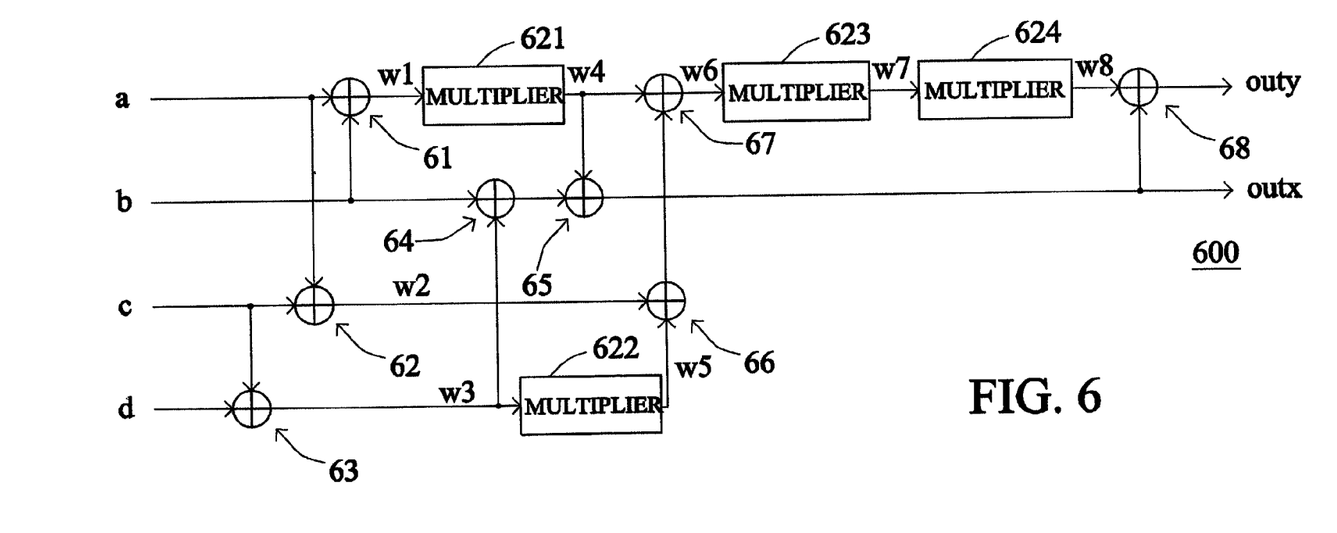
FIG. 6 is a block diagram of an integrated MixColumns/InvMixColumns module, capable of use in encryption and encryption of AES, according to a second embodiment of the invention.

FIG. 6 illustrates an integrated MixColumns/InvMixColumns module, capable of use in encryption and decryption of AES, in block diagram form. A MixColumns/InvMixColumns module 600 includes a number of EX-OR gates and multipliers, wherein the EX-OR gates and multipliers are coupled according to the operations listed in TABLE 1. Each of the EX-OR gates performs EX-OR operation on two respective input data codes while each of the multipliers doubles the value of its respective input data codes. The MixColumns/InvMixColumns module 600 has four inputs, namely, a, b, c, and d, and two outputs, namely, outx and outy. Since the connections among the EX-OR gates and multipliers are illustrated as the listed operations, the details of connections will not be described, for the sake of brevity. In the following description, the operation of the MixColumns/InvMixColumns module 600 is described.

In MixColumns and InvMixColumns, matrix multiplication is performed on every column of the respective input data codes (in matrix form). Suppose that an input data code is of the type of 4×4 matrix. Since there are four elements on each column, for the sake of simplicity, the four elements are denoted by code(a), code(b), code(c), and code(d), respectively, and correspond to a, b, c, and d shown in FIG. 6. Referring to TABLE 1, the steps of performing MixColumns are described as follows. Step 1 can be implemented by using EX-OR gate 61 to perform EX-OR on the code(a) and code(b) and to output data W1. Step 2 can be implemented by using EX-OR gate 62 to perform EX-OR operation on the code(a) and code(c) and to output data W2. Step 3 can be implemented by using EX-OR gate 63 to perform EX-OR operation on the code(c) and code(d) and to output data W3. Step 4 can be implemented by using multiplier 621 to perform multiplication of the output data W3 from the EX-OR gate 61 by two and to output data W4. Step 5 can be implemented by using EX-OR gate 64 to perform EX-OR operation on the code(b) and data W3, and then by using EX-OR gate 65 to perform EX-OR operation on the output data from the EX-OR gate 64 and the data W4 from the multiplier 621, wherein the output data from the EX-OR gate 65 is the result (outx) from the MixColumns/InvMixColumns module 600 performing MixColumns on the row with the elements code(a), code(b), code(c), and code(d).

The steps of performing InvMixColumns are as follows. As mentioned above, the first five steps for InvMixColumns are identical to the steps of MixColumns, and the description for InvMixColumns proceeds with step 6. Step 6 can be implemented by using multiplier 622 to multiply the output data W3 from the EX-OR gate 63 by two and to output data W5. Step 7 can be implemented by using EX-OR gate 66 to perform EX-OR operation on the data W2 and W5, and then by using EX-OR gate 67 to perform EX-OR operation on the output data from the EX-OR gate 66 and the data W4 from the multiplier 621 and to output data W6. Step 8 can be implemented by using multiplier 623 to multiply the data W6 from the EX-OR gate 67 by two and to output data W7. Step 9 can be implemented by using multiplier 624 to multiply the data W7 from the multiplier 623 by two and to output data W8. Step 10 can be implemented by using EX-OR gate 68 to perform EX-OR operation on the output data from the EX-OR gate 65 and the data W8, wherein the output data from the EX-OR gate 68 is the result (outy) from the integrated MixColumns/InvMixColumns module 600 performing InvMixColumns on the row with the elements code(a), code(b), code(c), and code(d).

Note that hardware complexity is greatly reduced because the first five steps are common to MixColumns and InvMixColumns.

Embodiment 3

Figure 7A:
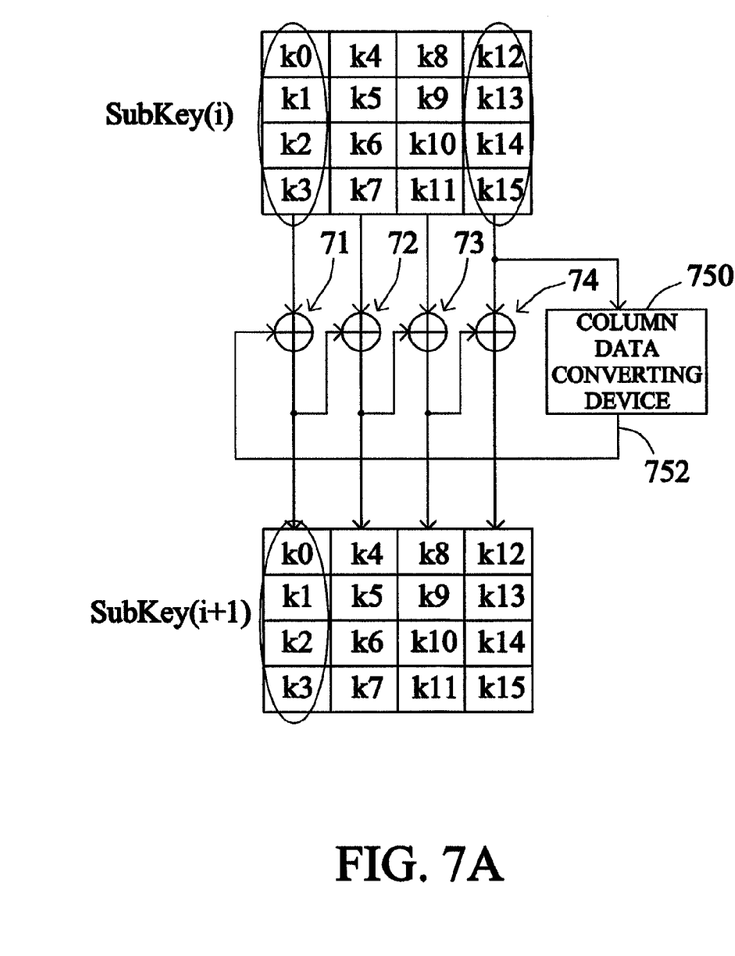
FIG. 7A illustrates the operation of determining the next subkey of an input subkey based on the input subkey.

In embodiment 3, a key expansion operation (KeyExpansion) device is provided to selectively produce either the previous subkey or the next subkey, based on an input subkey, wherein the input subkey is referred to as given subkey and the subkey to be produced by KeyExpansion is referred to as desired subkey. The following will describe the operation of KeyExpansion. FIG. 7A illustrates the operation of determining the next subkey of an input subkey based on the input subkey. The input subkey is denoted by SubKey(i) and the next subkey is denoted by SubKey(i+1). Suppose the subkeys are of 128 bits and are represented as 4×4 matrices, each of which has four columns of bytes. As shown in FIG. 7A, data column 1, i.e., bytes in column 1, of a subkey, such as SubKey(i) or SubKey(i+1), consists of elements k0 to k3 (or denoted by k[3:0]); data column 2, i.e., bytes in column 2, consists of elements k4 to k7 (or k[7:4]); data column 3, i.e., bytes in column 3, consists of elements k8 to k11 (or k[11:8]); and data column 4, i.e., bytes in column 4, consists of elements k12 to k15 (or k[15:12]). First, a column data converting device 750 converts data column 4 of SubKey(i) into special data column 752. In the column data converting device 750, (1) a "rotate byte right" operation is first performed on the input data, (2) EX-OR operation is to be perform on the first byte of the input data after the rotate byte right operation and a round constant Rcon[i], and (3) a 4-byte result from (2) is outputted, thereby producing the special data column 752. For the round constant Rcon[i], i is indicative of the round number and determines the value of Rcon. According to the definition in AES, Rcon[0]=1 and Rcon[i]=Xtime(Rcon[i−1]). Next, EX-OR gate 71 performs EX-OR operation on the special data column 752 and data column 1 of the SubKey(i), resulting in data column 1 of the SubKey(i+1). EX-OR gate 72 performs EX-OR operation on the data column 2 of the SubKey(i) and the data column 1 of the SubKey(i+1), resulting in data column 2 of the SubKey(i+1). Likewise, EX-OR gate 73 performs EX-OR operation on the data column 3 of the SubKey(i) and the data column 2 of the SubKey(i+1), resulting in data column 3 of the SubKey(i+1). Finally, EX-OR gate 74 performs EX-OR operation on the data column 4 of the SubKey(i) and the data column 3 of the SubKey(i+1), resulting in data column 4 of the SubKey(i+1).

Figure 7B:
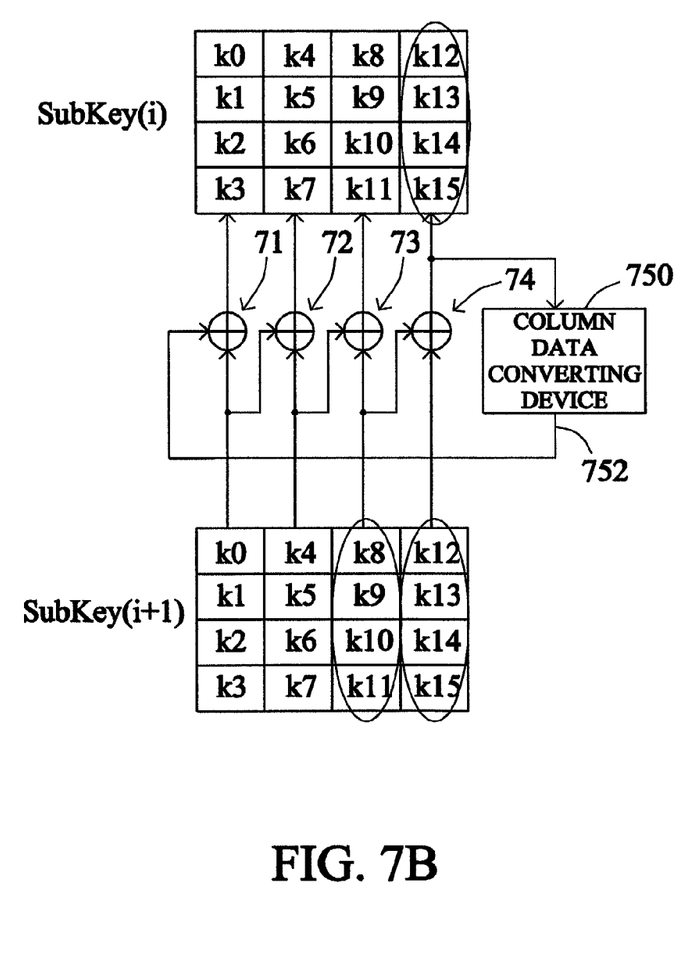
FIG. 7B illustrates the operation of determining the previous subkey of an input subkey based on the input subkey.

FIG. 7B illustrates the operation of determining the previous subkey of an input subkey based on the input subkey. First, the EX-OR gate 74 performs EX-OR operation on the data column 3 of the SubKey(i+1) and the data column 4 of the SubKey(i+1), resulting in the data column 4 of the SubKey(i). The data column 4 of the SubKey(i) is then converted into special data column 752 by the column data converting device 750. The special data column 752 is fed into the EX-OR gate 71, and the EX-OR gate 71 performs EX-OR operation on the special data column 752 and the data column 1 of the SubKey(i+1), resulting in the data column 1 of the SubKey(i). As shown in FIG. 7B, the EX-OR gate 72 performs EX-OR operation on the data column 1 of the SubKey(i+1) and the data column 2 of the SubKey(i+1), resulting in the data column 2 of the SubKey (i). Similarly, EX-OR gate 73 performs EX-OR operation on the data column 2 of the SubKey(i+1) and the data column 3 of the SubKey(i+1), resulting in the data column 3 of the SubKey(i).

Figure 8:
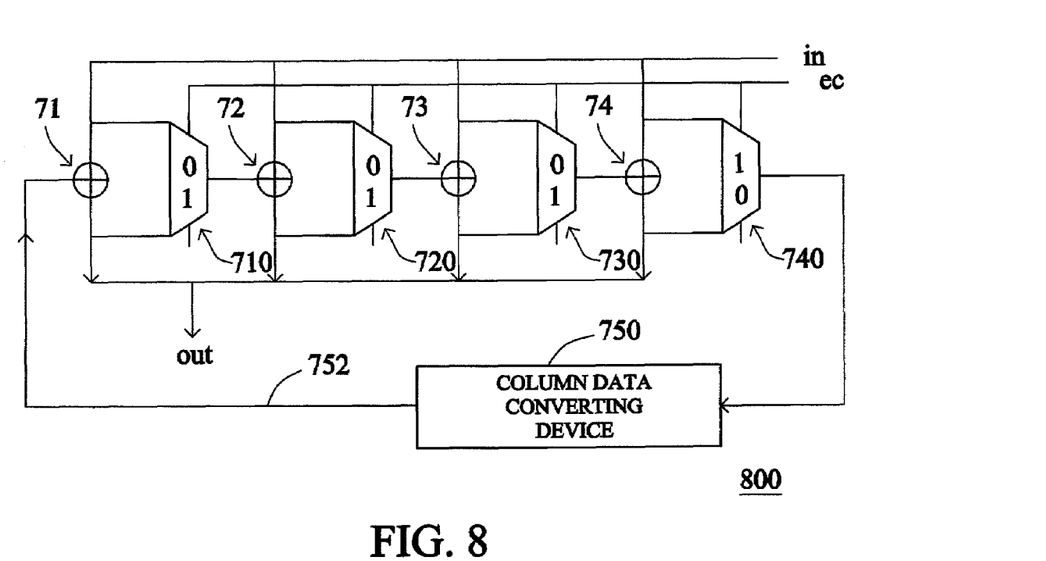
FIG. 8 is a block diagram of a key expansion operation module according to a third embodiment of the invention.

FIG. 8 illustrates a key expansion (KeyExpansion) module 800 according to a third embodiment of the invention. The KeyExpansion module 800 includes the EX-OR gates 71, 72, 73, 74, multiplexers 710, 720, 730, 740, and the column data converting device 750. The input data code (denoted by "in") is the current subkey (i.e., the given subkey) and the output data code (denoted by "out") may be either the next subkey or the previous subkey, (i.e., the desired subkey). Each of the multiplexers has an input terminal (0) and input terminal (1) and selectively outputs data from one of the input terminals according to a selection signal (denoted by "ec"). When the selection signal ec is set to 1, the desired subkey is the next subkey. When the selection signal ec is set to 0, the desired subkey is the previous subkey. As shown in FIG. 8, data column 1 of the given subkey is fed into the EX-OR gate 71 and the input terminal (0) of the multiplexer 710. Data column 2 of the given subkey is fed into the EX-OR gate 72 and the input terminal (0) of the multiplexer 720. Data column 3 of the given subkey is fed into the EX-OR gate 73 and the input terminal (0) of the multiplexer 730. Data column 4 of the given subkey is fed into the EX-OR gate 74 and the input terminal (0) of the multiplexer 740. In addition, the output data of the EX-OR gate 71 is the data column 1 of the desired subkey and is fed into the input terminal (1) of the multiplexer 710. The output data of the EX-OR gate 72 is the data column 2 of the desired subkey and is fed into the input terminal (1) of the multiplexer 720. The output data of the EX-OR gate 73 is the data column 3 of the desired subkey and is fed into the input terminal (1) of the multiplexer 730. The output data of the EX-OR gate 74 is the data column 4 of the desired subkey and is fed into the input terminal (0) of the multiplexer 740. In the following description, the operations of KeyExpansion and InvKeyExpansion implemented in the KeyExpansion module 800 are to be described.

KeyExpansion

KeyExpansion is to output the next subkey, i.e., desired subkey, of an input subkey, i.e., given subkey, based on the input subkey. When the selection signal ec is set to 1, the data column 4 of the given subkey can be converted into the special data column 752 by the column data converting device 750 via the multiplexer 740. The special data column 752 is then fed into the EX-OR gate 71, and the EX-OR gate 71 performs EX-OR operation on the special data column 752 and the data column 1 of the given subkey, resulting in the data column 1 of the next subkey. As can be derived from FIG. 8, where the selection signal ec is set to one, the data column 1 of the next subkey is fed into the EX-OR gate 72 through the multiplexer 710, and the EX-OR gate 72 performs EX-OR operation on the data column 1 of the next subkey and the data column 2 of the given subkey, resulting in the data column 2 of the next subkey. The data column 2 of the next subkey is fed into the EX-OR gate 73 through the multiplexer 720, and the EX-OR gate 73 performs EX-OR operation on the data column 2 of the next subkey and the data column 3 of the given subkey, resulting in the data column 3 of the next subkey. The data column 3 of the next subkey is fed into the EX-OR gate 74 through the multiplexer 730, and the EX-OR gate 74 performs EX-OR operation on the data column 3 of the next subkey and the data column 4 of the given subkey, resulting in the data column 4 of the next subkey.

InvKeyExpansion

InvKeyExpansion is to output the previous subkey, i.e., desired subkey, of an input subkey, i.e., given subkey, based on the input subkey. When the selection signal is set to 0, the data column 3 of the given subkey is fed into the EX-OR gate 74 through the multiplexer 730, and the EX-OR gate 74 performs EX-OR operation on the data column 3 of the given subkey and the data column 4 of the given subkey, resulting in the data column 4 of the previous subkey. Next, the data column 4 of the previous subkey is fed into the column data converting device 750 through the multiplexer 740, so as to obtain the special data column 752. The special data column 752 is then fed into the EX-OR gate 71, and the EX-OR gate 71 performs EX-OR operation on the special data column 752 and the data column 1 of the given subkey, resulting in the data column 1 of the previous subkey. As can be derived from FIG. 8, where the selection signal ec is set to 0, the data column 1 of the given subkey is fed into the EX-OR gate 72 through the multiplexer 710, and the EX-OR gate 72 performs EX-OR operation on the data column 1 of the given subkey and the data column 2 of the given subkey, resulting in the data column 2 of the previous subkey. The data column 2 of the given subkey is fed into the EX-OR gate 73 through the multiplexer 720, and the EX-OR gate 73 performs EX-OR operation on the data column 2 of the given subkey and the data column 3 of the given subkey, resulting in the data column 3 of the previous subkey.

Embodiment 4

In embodiment 4, an integrated encryption/decryption algorithm for use in AES and its hardware implementation are provided. The encryption/decryption algorithm can be expressed by the pseudo-C code as follow:

```
if (ec == 0)
    for (i = 0; i < round; i++) Inv_Opt_keyexpansion(key,1);
    //inverse key
for (i = 0; i <= round; i++)
{ addroundkey;
    if (i == 10) break;
    Inv_Opt_keyexpansion(key, ec);
    if (ec == 1)
    {   Inv_Opt_subbytes(ec);
        Inv_Opt_shiftrows(ec);
        if (i < 9) Inv_Opt_mixcolumns(ec);
    } else
    {   if (i > 0) Inv_Opt_mixcolumns(ec);
        Inv_Opt_subbytes(ec);
        Inv_Opt_shiftrows(ec);
    }
}
```

Figure 9:
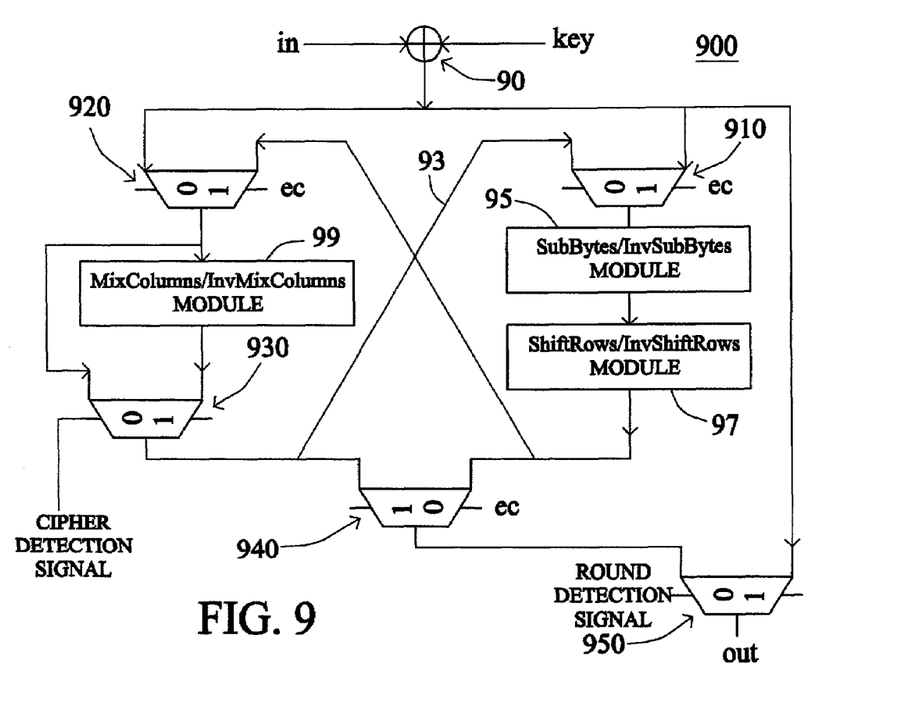
FIG. 9 is a block diagram of a system for encryption and decryption, capable of use in encryption and encryption of AES, according to a fourth embodiment of the invention.

Referring to FIG. 9, an encryption/decryption system for use in AES implementing the above algorithm is illustrated according to a fourth embodiment of the invention. The encryption/decryption system 900 includes an EX-OR gate 90, a SubBytes/InvSubBytes module 95, a ShiftRows/InvShiftRows module 97, a MixColumns/InvMixColumns module 99, and multiplexers 910, 920, 930, 940, and 950. When it is required to encrypt an input data code, the selection signal ec is set to 1, configuring the encryption/decryption system 900 to perform encryption. First, the input data code (in), i.e., the plaintext, and a subkey are fed into the EX-OR gate 90 to perform AddRoundKey. Through the multiplexer 910, the result of the AddRoundKey is outputted into the SubBytes/InvSubBytes module 95 to perform SubBytes. The result of the SubBytes is then fed into the ShiftRows/InvShiftRows module 97 to perform ShiftRows. Next, through the multiplexer 920, the result of the ShiftRows is fed into the MixColumns/InvMixColumns module 99 to perform MixColumns. The result of the MixColumns and the result of the ShiftRows are fed into the input terminal (0) and input terminal (1) of the multiplexer 930, respectively. According to a cipher detection signal, the multiplxer 930 selects one data code from the two input terminals as its output data code, wherein the cipher detection signal can be expressed as:

$$\sim((ec\&(i==4'd9))|(\sim ec\&(i==4'd0))).$$

In this way, when the cipher detection signal is equal to 1, the multiplexer 930 outputs the output data from the MixColumns/InvMixColumns module 99; when the cipher detection signal is equal to 0, the multiplexer 930 outputs the output data from the multiplexer 920. The output data from the multiplexer 930 is called cipher data code 93 for the sake of simplicity. As shown in FIG. 9, the cipher data code 93 is fed into both the input terminal (0) of the multiplexer 910 and the input terminal (1) of the multiplexer 940. Since the selection signal ec is equal to 1, the multiplexer 940 outputs the cipher data code 93 to the input terminal (0) of the multiplexer 950. The input terminal (1) of the multiplexer 950 is for receiving the output data from the EX-OR gate 90. According to a round detection signal, the multiplexer 950 selects one data code from its two input terminals as its output data code. The round detection signal can be expressed as (i==4'd10). That is, the round detection signal is equal to 1 when (i==4'd10) is true; otherwise, the round selection signal is equal to 0. When the round detection signal is equal to 0, the multiplexer 950 outputs the output data from the multiplexer 940, e.g., as the input data code (in) for the next round. Next, the looping of the encryption/decryption algorithm above is repeated so as to perform AddRoundKey, SubBytes, ShiftRows, and MixColumns, and so on for encryption until (i==4'd9) is true. When i is equal to 4'd9, the cipher detection signal is equal to 0 since ec is equal to 1, resulting in the multiplexer 930 outputting the output data from the multiplexer 920. The output data from the multiplexer 920 is then outputted through the multiplexers 940 and 950. Afterwards, as (i==4'd10) is true, AddRoundKey is performed on the input data code (in) and subkey so as to generate the required ciphertext. The encryption procedure is ended.

When it is required to decrypt an input data code, the selection signal ec is set to 0. The input data code (in), i.e., the ciphertext, and a subkey, i.e., the last subkey for the ciphertext, are fed into the EX-OR gate 90 to perform AddRoundKey. Through the multiplexer 920, the result of the AddRoundKey is then fed into the MixColumns/InvMixColumns module 99 to perform InvMixColumns. In addition, the result of the AddRoundKey and the result of the InvMixColumns are fed into the input terminal (0) and input terminal (1) of the multiplexer 930, respectively. The multiplexer 930, according to the cipher detection signal, selects one data code from the two input terminals, wherein the cipher detection signal is described above. When the cipher detection signal is equal to 1, the multiplexer 930 outputs the output data from the MixColumns/InvMixColumns module 99. When the cipher detection signal is equal to 0, the multiplexer 930 outputs the output data from the multiplexer 920. The output data from the multiplexer 920 is referred to as the cipher data code 93. Since the selection signal is equal to 0, the multiplexer 910 outputs the cipher data code 93 to the SubBytes/InvSubBytes module 95 to perform InvSubBytes. The result of the InvSubBytes is fed into the ShiftRows/InvShiftRows module 97 to perform InvShiftRows. The result of the InvShiftRows is then outputted through the multiplexer 940 (since the selection signal is equal to 0). Next, the multiplexer 950, according to the round detection signal, selects one data code from its two input terminals as its output data code. When the round detection signal is equal to 0, the multiplexer 950 outputs the output data from the multiplexer 940, e.g., as the input data code (in) for the next round, and the looping of the encryption/decryption algorithm above is repeated so as to perform AddRoundKey, InvMixColumns, InvSubBytes, and InvShiftRows, and so on for decryption until (i==4'd0) is true. When i is equal to 4'd0, the cipher detection signal is equal to 0, resulting in the multiplexer 930 outputting the output data from the multiplexer 920 to the multiplexer 910. The multiplexer 910 feeds the output data from the multiplexer 920 into the SubBytes/InvSubBytes module 95 to perform InvSubBytes. The result of the InvSubBytes is then fed into ShiftRows/InvShiftRows module 97 to perform InvShiftRows. Next, the result of the InvShiftRows is outputted through the multiplexers 940 and 950. Afterwards, as (i==4'd10) is true, AddRoundKey is performed on the input data code (in), i.e., the result of the InvShiftRows previously performed, and subkey so as to generate the required plaintext. The decryption procedure is ended.

As disclosed in the embodiments above, the encryption/decryption system for use in AES according to the invention has the following advantages that:

(1) A common look-up table is employed for performing either SubBytes or InvSubBytes so as to reduce hardware complexity and operating resource; and (2) The hardware implementation of MixColumns and InvMixColumns is integrated so as to reduce hardware complexity and operating resource.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for performing a byte substitution operation (SubBytes) and an inverse byte substitution operation (InvSubBytes) selectively on an input data code so as to output a required output data code, capable of use in encryption and decryption of advanced encryption standard (AES), the apparatus comprising:

an inverse matrix operation module for receiving the input data code so as to perform an inverse matrix operation on the input data code and output the result of the inverse matrix operation;

a first multiplexer having a first input terminal and a second input terminal, the first input terminal being coupled to the inverse matrix operation module so as to receive the result of the inverse matrix operation and the second input terminal receiving the input data code, wherein the first multiplexer selects one of the input data code and the result of the inverse matrix operation as the first multiplexer's output data code, according to a selection signal;

a multiplicative inverse operation module coupled to the first multiplexer for outputting a table-lookup data code based on the output data code from the first multiplexer after table-look up;

a matrix operation module for receiving the table-lookup data code, performing a matrix operation, and outputting the result of the matrix operation; and a second multiplexer having a first terminal and a second terminal, the second terminal of the second multiplexer being coupled to the matrix operation module so as to receive the result of the matrix operation and the first terminal of the second multiplexer being coupled to the multiplicative inverse operation module so as to receive the table-lookup data code, wherein the second multiplexer selects one of the table-lookup data code and the result of the matrix operation as the second multiplexer's output data code, according to the selection signal, and wherein the output data code from the second multiplexer is the required output data code for the apparatus.

2. The apparatus according to claim 1, wherein SubBytes is performed when the selection signal is equal to 1 and InvSubBytes is performed when the selection signal is equal to 0.

3. The apparatus according to claim 1, wherein the selection signal is a one-bit digital signal having a first digital state or a second digital state.

4. The apparatus according to claim 3, wherein SubBytes is performed when the digital signal has the first digital state and InvSubBytes is performed when the digital signal has the second digital state.

* * * * *